United States Patent [19]
Letarte et al.

[11] Patent Number: 5,255,896
[45] Date of Patent: Oct. 26, 1993

[54] ELECTRIFIED FENCE FOR CHASING PIGEONS AWAY

[75] Inventors: Lucien Letarte, Notre-Dame-des-Prairies; Roméo Boyer, Verdun, both of Canada

[73] Assignee: Financiere Inter-Plus, Inc., Quebec, Canada

[21] Appl. No.: 731,130

[22] Filed: Jul. 15, 1991

[51] Int. Cl.⁵ .............................................. H05C 1/00
[52] U.S. Cl. ........................................ 256/10; 256/47; 256/55; 256/54; 411/55; 174/168; 43/124; 52/101
[58] Field of Search ............... 256/10, 11, 47, 48, 256/52, 54, 55; 411/44, 55; 52/101, 242, 478, 717.1; 174/168, 174, 137 RT; 43/124

[56] References Cited

U.S. PATENT DOCUMENTS

| | | | |
|---|---|---|---|
| D. 185,959 | 8/1959 | Schroeder | D13/184 |
| D. 209,054 | 10/1967 | Braiman et al. | D13/125 |
| 346,972 | 8/1886 | Wilson | 174/168 |
| 556,194 | 3/1896 | Meaher | 256/54 X |
| 664,176 | 12/1900 | Risler | 256/54 X |
| 726,846 | 5/1903 | Bell | 256/54 X |
| 770,962 | 9/1904 | Gill | 174/168 |
| 831,338 | 9/1906 | Glick | 174/175 |
| 879,033 | 2/1908 | Caldwell | 174/174 X |
| 894,616 | 7/1908 | Fay | 174/168 |
| 919,386 | 4/1909 | Schaub | 256/54 X |
| 965,723 | 7/1910 | Malthaner | 256/54 X |
| 1,530,298 | 3/1925 | Chambless et al. | 174/174 X |
| 2,445,009 | 7/1948 | Strauss et al. | 174/45 G |
| 2,870,242 | 1/1959 | Wilkerson | 174/48 X |
| 2,947,885 | 8/1960 | Müller | 256/10 X |
| 3,246,076 | 4/1966 | Stoneburner | 256/54 X |
| 3,366,854 | 1/1968 | Robinson | 256/10 X |
| 3,370,834 | 2/1968 | Reznicek | 256/10 |
| 3,531,888 | 10/1970 | Wells et al. | 43/21.2 |
| 3,999,339 | 12/1976 | Sappenfield | 52/717.1 |
| 4,580,767 | 4/1986 | Zimmerman | D13/153 X |
| 4,720,224 | 1/1988 | Peterken . | |

FOREIGN PATENT DOCUMENTS

| | | | |
|---|---|---|---|
| 493110 | 5/1953 | Canada | 256/48 |
| 56798 | 1/1891 | Fed. Rep. of Germany | 411/55 |
| 824358 | 8/1949 | Fed. Rep. of Germany | 174/174 |
| 2328618 | 1/1975 | Fed. Rep. of Germany | 174/168 |
| 2458317 | 6/1976 | Fed. Rep. of Germany | 411/55 |
| 0219083 | 2/1985 | Fed. Rep. of Germany | 174/158 R |
| 0259708 | 8/1988 | Fed. Rep. of Germany | 174/158 R |
| 242115 | 8/1946 | Switzerland | 256/10 |
| 7775 | of 1903 | United Kingdom | 411/55 |

OTHER PUBLICATIONS

Flyaway, Avian Averting System, 519 I.H.30 suite 250 Rockwall, Texas 75087.
1-page advertising brochure for "Red Ring Kwik-Bolt Stud Anchor".
Figure 5 insulator on p. 38 of HH Smith catalog 820, 1983.

*Primary Examiner*—Dennis L. Taylor
*Assistant Examiner*—Heather Chun
*Attorney, Agent, or Firm*—Collard & Roe

[57] ABSTRACT

There is disclosed an electric fence for chasing away pigeons or the like undesired birds. The fence comprises a series of spaced posts made of electrically insulating material, each post having a flat top end cut across by a groove having a depth of predetermined size and formed with a tapped hole adjacent to the groove. An electric wire, having a positive section, extends successively through the grooves of the posts, this wire having a diameter greater than the predetermined sized above mentionned so as to projecting out of the grooves. Screws are provided which have threaded stems and flat heads, the stems being screwed to one of the tapped holes. The screws heads have a width which is sufficient to overlap the electric wire projecting out of the grooves in a manner such that the screws clamp the electric wire against the posts.

20 Claims, 3 Drawing Sheets

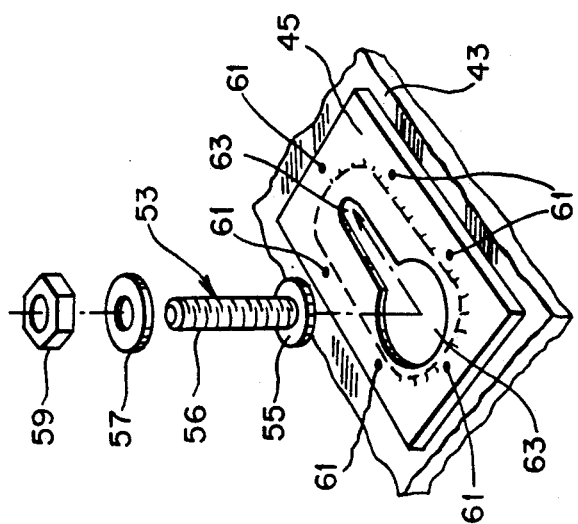
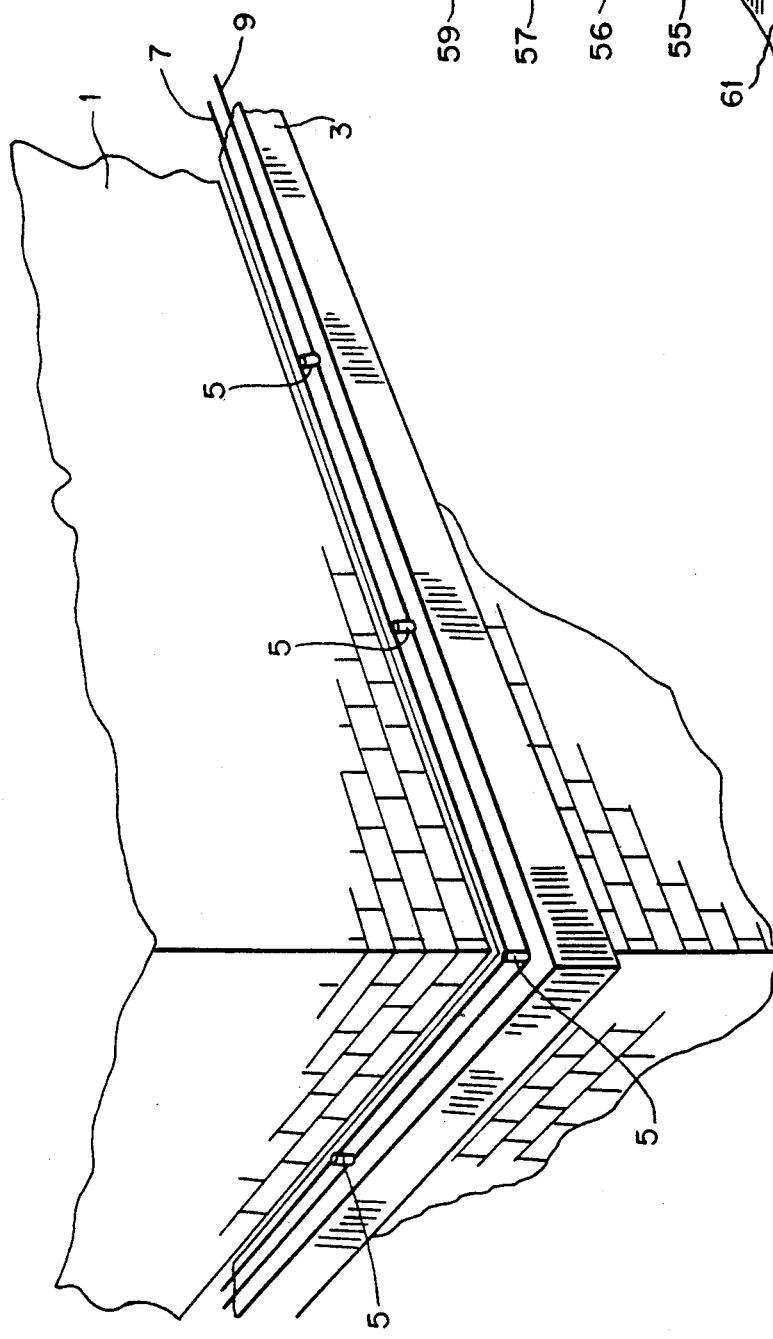

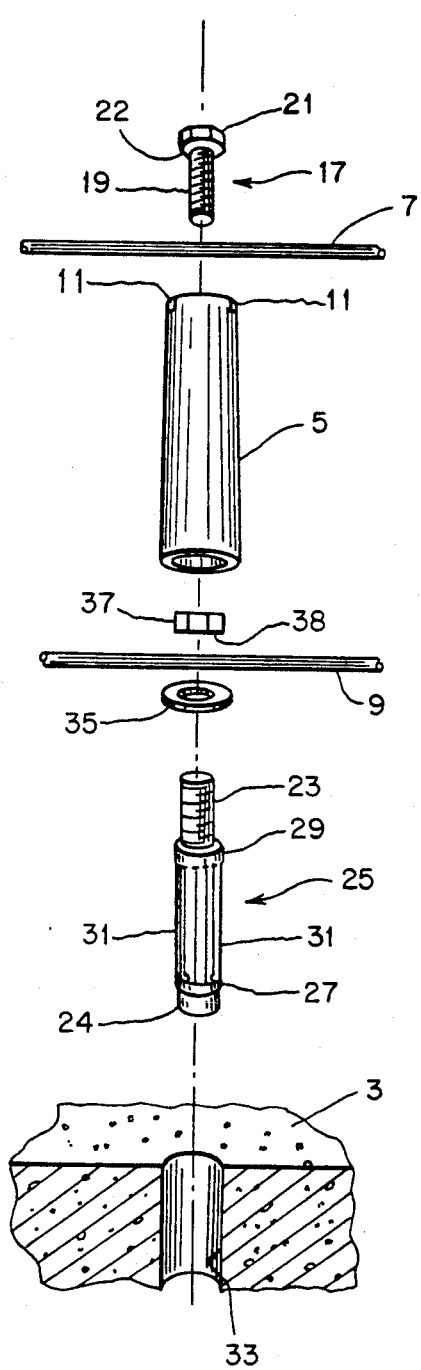
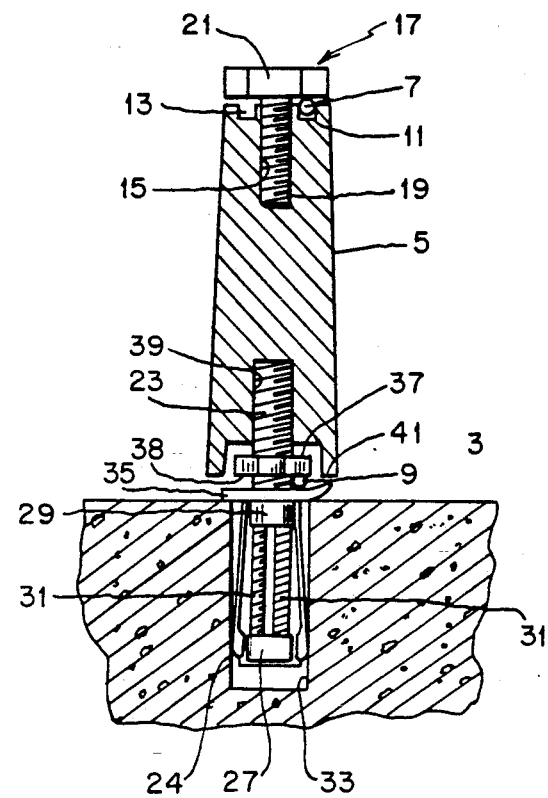
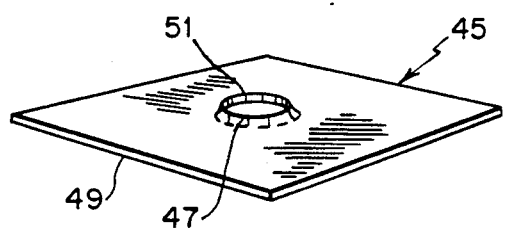
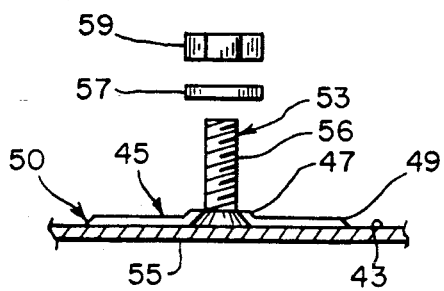

5,255,896

ELECTRIFIED FENCE FOR CHASING PIGEONS AWAY

BACKGROUND OF THE INVENTION

1. Field of the Invention

The present invention relates to an improved post of an electrified fence intended to chase away pigeons or the like undesired birds, the post serving to hold and secure an electric wire.

The invention also relates to an improved fence using such posts.

2. Description of the Prior Art

Pigeons, when in large number, are well known to soil buildings to a point where cleaning becomes a major and costly problem. Resort has been had, for sometimes and with success, to the use of electrified wire installations in the form of small electric fences capable of producing short electric pulses of small magnitude not damageable to birds but sufficient to chase them away. These fences are mounted along the ledges of a building facade and include a plurality of short spaced posts made of electrically insulating material and of which the top end receives the positive section of the electric wire and the bottom end, the return or negative section. Each post is provided at its top, with a cap having an annular part and a series of peripheral fingers spaced from one another and bent away from the annular part. The cap is fixed to the post top end by a screw at its center; the bent fingers holding the annular part away from the post at a distance sufficient to allow the electric wire to be slid between the fingers. A similar situation exists at the bottom end of the post where the return wire is only slid across and not fixed to the posts.

The difficulty with this type of post construction is that it is not easy to keep the electric wire taut between the posts because it slides across them. It consequently sometimes happens that the wire sections sag between the posts sufficiently to touch one another and cause short circuits.

SUMMARY OF THE INVENTION

It is an object of the invention to provide an improved fence post capable of avoiding this difficulty by clamping at least the top or positive section of the wire to the posts after it has been stretched sufficiently between them to avoid undue sagging.

More specifically, the invention proposes a post for use in mounting an electric wire, in an electrified fence intended to chase away pigeons or the like undesired birds, this post comprising a body made of electrically insulating material having a flat top end crossed with a groove having a depth of predetermined size, smaller than the diameter of the electric wire it is to receive, the top end being further formed with a tapped hole adjacent to the groove. A screw is provided which has a threaded stem for mounting into the tapped hole and having a screwing head. The latter has a width sufficient to overlap the groove as well as the electric wire when the latter is in the groove, when the screw is screwed into the tapped hole. The post preferably has a further and like groove across the flat top end, the tapped hole being located centrally between the grooves which may conveniently be straight and parallel.

The invention also concerns an electric fence which comprises a plurality of posts, an electric wire and screws like the ones described above, the electric wire extending successively through the grooves of the posts. Again, the screwing heads have a width which is sufficient to overlap the projecting electric wire so that the screws clamp the electric wire against the post.

Where the fence is for mounting on a building ledge made of electrically insulating material, the fence further comprises anchor bolts fixed to and projecting upwardly from the ledge and washers slid over the anchor bolts. Here, the negative section of the electric wire extends between the post and is mounted on the washers next to the anchor bolts; nuts being threaded on the anchor bolts to clamp this second wire section on the washers. The posts, on the other hand, are formed at their bottom ends with a tapped hole; the anchor bolts being screwed into these tapped holes of the posts.

Where the building ledge is made of electrically conducting material, it becomes part of the fence which further comprises anchor bolts and means securing the bolts to the ledge to project upwardly from it. The posts are here formed, at their bottom ends, with tapped holes; the anchor bolts having threaded stems screwed into the tapped holes.

Other features of the invention are to be found in the description that follows of a preferred embodiment having reference to the appended drawings.

BRIEF DESCRIPTION OF THE DRAWINGS

FIG. 1 is a perspective partial view of a building facade showing a ledge on which an electrified fence is mounted;

FIG. 2 is an exploded view showing the components of a post assembly individually and with part of a building ledge shown in perspective and in cross section;

FIG. 8 is a longitudinal cross section of a post and wire installation on a building ledge;

FIG. 9 is a longitudinal cross section of an anchoring assembly for the bottom end of a post;

FIG. 9a is a perspective view of a part of the assembly of FIG. 9; and

FIG. 10, first sheet of drawings, is a perspective view of a variant of an anchor plate in the assembly of FIG. 9.

DETAILED DESCRIPTION OF THE PREFERRED EMBODIMENT

Figure 3:
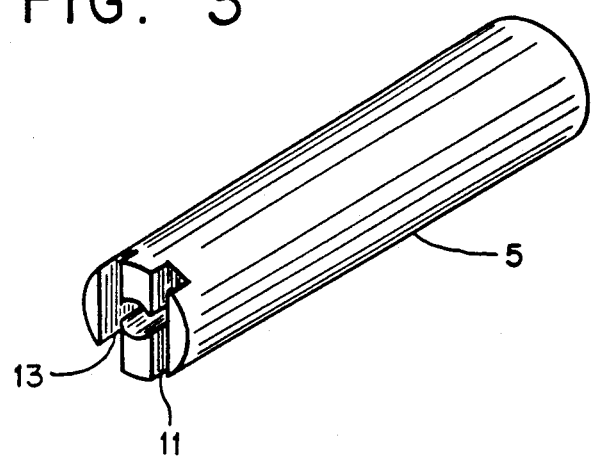
FIG. 3 is a perspective view of a post made according to the invention.

FIG. 1 shows part of a corner of a building facade 1 having a ledge or cornice 3 on which is mounted an electrified fence made up of a series of spaced posts 5 at the top and bottom ends of which are fixed the positive strand or section 7 and the negative or return strand or section 9 of an electric wire; the sections being connected, at their free ends, to a power source (not shown) capable of supplying short electric impulses.

Figure 4:
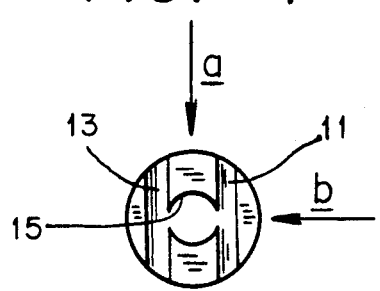
FIG. 4 a top end view.
Figure 5:
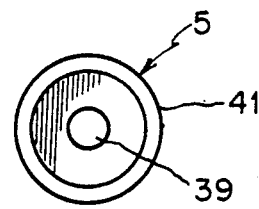
FIG. 5 a bottom end view.
Figure 6:
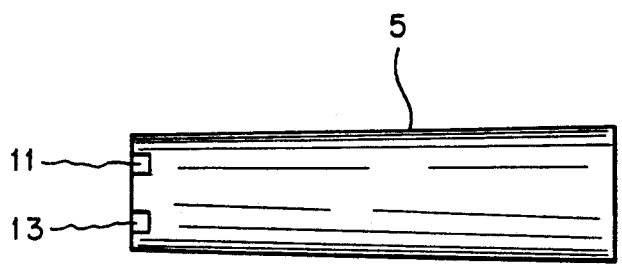
FIG. 6 a side view taken from arrow a in FIG. 4 and FIG. 7 another side view but from arrow b in FIG. 4; all of FIGS. 3 to 7 appearing on the third sheet of drawings.
Figure 7:
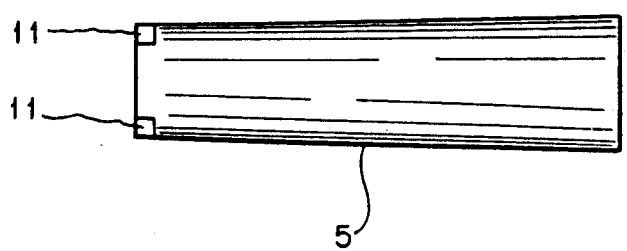

Each post 5 consists of an elongated body made of electrically insulating material which may be slightly frusto-conical. As best shown in FIGS. 3 and 4, the top end of the post is flat and is cut across with a groove 11 and, more conveniently, with a second and like alternative groove 13 both rectangular in cross section. While only one groove is required, two are preferably provided to ensure that, in positioning the posts, one groove can always be made available on the post side close to the edge of the ledge 3, once the posts are secured into position prior to laying out the wire. The grooves 11, 13, are straight and parallel.

The top end of each post is also provided with a tapped hole 15 located centrally between the grooves 11, 13. The hole 15 receives the threaded stem 19 of a screw 17 of which the polygonal flat head 21 is wide enough to overlap both grooves and consequently the wire strand or section 7 of the wire in the groove 11.

According to the invention, the like grooves 11, 13, have a depth of predetermined size which is smaller than the diameter of the wire section 7 which is received and clamped into the groove 11, as clearly shown in FIG. 8. In this manner, once the positive section 7 of the wire has been clamped into the groove 11 of a first post 5, it is slid into the groove 11 of the following post and clamped therein after having been pulled taut to avoid subsequent sagging. The procedure is repeated at the successive posts.

Advantageously, the flat head 21 of the screw 17 has a radial surface 22 and it is possible to further tighten the wire section 7 by selecting the groove 11 or 13 that is underneath the portion of the radial surface 22 moving in the tightening direction when the screw is engaged in the tapped hole 15. In that case, the radial surface 22 will engage and draw tee wire section 7 in the tightening direction.

A similar construction exists for connecting the negative or return section 9 of the wire when the fence is mounted on a ledge 3 made of electrically insulating material, such as stone or concrete, as shown in FIG. 8. Here, each post 5 is mounted on the upper end of an anchor bolt 23 of an anchoring device 25 which may be conventional. The one used here includes a sleeve over the bolt 23, which is made up of three or four laterally expandible bottom ring segments 27 resting against a head 24 of the bolt 23, a top ring 29 free to slide along the bolt and three or four laterally expandible arms 31 solid at their ends with a corresponding ring segment 27, and the ring 29. The device 25 is first introduced into a hole 33 previously drilled in the ledge 3. A washer 35 is thereafter slid on the bolt 23 and the negative section 9 of the electric wire is subsequently placed over the washer. The assembly is then tightened over the sliding top ring 29 by a nut 37, causing the arms 31 and the ring segments 27 to bulge out and become pressed against the bore of the hole 33. Simultaneously, the ire section 9 is clamped between the nut 37 and the washer 35. To prevent the wire section 9 to slide away from the bolt 23, the washer 35 may be turned up slightly, as shown. The bottom end of the post 5 is formed with a tapped hole 39 coaxial with hole 15 and threaded over and thus fixed to the anchor bolt 23, once the latter is secured to the ledge 3. Advantageously, the post 5 has a peripheral protecting skirt 41, at its bottom end, surrounding the nut 37.

Advantageously, the nut 37 has a radial surface 38 and it is possible to further tighten the wire section 9 by positionning the electric wire over the turned up side of the washer 35 and underneath the portion of the radial surface 38 moving in the tightening direction when the nut 37 is screwed on the bolt 23. In that case, the radial surface 38 will engage and draw the wire section 9 in the tightening direction.

Where the building ledge is covered with an electrically conducting sheeting 43, such as copper which then acts as the return path for the current, that is as the wire negative section, the posts 5 may be secured directly on it by anchoring means of the type illustrated in FIG. 9. The latter means comprise, for each post, a base plate 45 which is upwardly curved at its center portion 47 and extends into a flat rim 49. The center portion is further provided with a bolt hole 51. An anchor bolt 53 having a bolt head 55 larger than the bolt hole 51 is set beneath the curved center-portion 47 and its stem 56 extends across the hole 51. The bolt head 55 and the plate 45 are preferably welded together especially with a mercury solution. The anchoring means are completed by a washer 57 (especially a lock washer) and a nut 59 clamping the base plate 45 and anchor bolt 53 together. Thereafter, the plate 45 of the assembly is fastened, advantageously welded, around flat rim 49, by any appropriated means (e.g. with a welding metal such as silver or tin) 50, to the sheeting 43 and the post 5 screwed on the anchor bolt 53.

In a variant, the base plate 45 may be spot-welded to the sheeting 43 prior to insertion of the bolt 53. As shown in FIG. 10, the bolt hole has here the shape of a key-hole slot having a large section 63, for the passage of the bolt head 55, and a narrow section 65 for the passage of the bolt stem 56. After welding of the plate 45, to the sheeting 43, the bolt 53 is inserted and its stem 56 is positionned in the slot narrow section 65. The bolt become lock in the plate 45 by firm clamping by the nut 59.

Advantageously, the electric wires 7 and 9 is a 2.5 mm high tensile aluminum coated steel wire.

Advantageously, the insulator post 5 is made by moulding a plastic material such as polycarbonate. Each post may have a height of 60 mm and an average diameter of 15 mm.

Advantageously, the bolts 21 and 53, the washers 35 and 57 and the anchor bolt 25 are made of stainless steel. Preferably, the bolt 53 is a PHILLIPS type machine screw of ¼" in diameter and ¾" in length.

Advantageously, in the installation shown in FIG. 1, there is five to six feet between each post 5.

We claim:

1. A post for use in mounting an electric wire, in an electrified fence intended to chase away pigeons or the like undesired birds, said post comprising:
   a body made of electrically insulating material having an upper end crossed with at least one groove having a depth of predetermined size, smaller than the diameter of an electric wire it is to receive, and being formed with a tapped hole adjacent to said groove;
   a screw having a threaded stem for mounting into said tapped hole, and having a screwing head, and wherein said head has a width sufficient to overlap said electric wire in said groove, and when said screw is screwed into said tapped hole and the electric wire is in said groove, said head directly engages said electric wire which allows for movement of the wire in the groove to thus tighten it with respect to a neighboring post and then clamps said electric wire against said upper end said post.

2. A post as claimed in claim 1, having a further and like groove across said top end, said tapped hole being located centrally between said grooves.

3. A post as claimed in claim 2, wherein said grooves are straight and parallel.

4. A post as claimed in claim 3, wherein said screwing head is flat.

5. An electric fence for chasing away pigeons or the like undesired birds, said fence comprising:
- a plurality of posts made of electrically insulating material, each post having an upper end crossed by at least one groove having a depth of predetermined size and being formed with a tapped hole adjacent to said groove;
- an electric wire having a positive section extending successively through said grooves of said posts and having a diameter greater than said predetermined size so as to project out of said grooves;
- screws having threaded stems and screwing heads, each stem being received into one of said tapped holes, and
- wherein said screwing heads have a width sufficient to overlap said projecting electric wire whereby each of said screws directly engages said electric wire and moves it in the groove to thus tighten it with respect of a neighboring post and then clamp said electric wire against said upper end of said post.

6. An electric fence as claimed in claim 5, wherein each post has a further and like groove across said top end, said tapped hole being located centrally between said grooves.

7. An electric fence as claimed in claim 6, wherein each grooves of each post are straight and parallel.

8. An electric fence as claimed in claim 7, wherein each screwing heads are flat.

9. An electric fence for chasing away pigeons or the like undesired birds, said fence comprising:
- a plurality of posts made of electrically insulating material, each post having a flat top end crossed by groove having a depth of predetermined size and being formed with a tapped hole adjacent to said groove;
- an electric wire having a positive section extending successively through said grooves of said posts and having a diameter greater than said predetermined size so as to project out of said grooves;
- screws having threaded stems and screwing heads; each stem being received into one of said tapped holes,
- wherein said screwing heads have a width sufficient to overlap said projecting electric wire whereby said screws clamp said electric wire against said posts;
- wherein each post has a further and like groove across said top end, said tapped hole being located centrally between said grooves;
- anchor bolts and means for securing said bolts to a building ledge to project upwardly therefrom;
- washers, each slid over one of said anchor bolts;
- wherein said electric wire has a negative section extending between said posts and mounted on said washers next to said anchor bolts;
- nut threaded on said anchor bolts and clamping said second wire section on said washers, and
- wherein said posts are each formed, at its bottom end, with a tapped hole; said anchor bolts being screwed into said bottom end tapped holes of said posts.

10. An electric fence as claimed in claim 9, wherein each of said washers has an upturned peripheral portion, and wherein said second wire is located between said upturned portion and said anchor bolts.

11. An electric fence as claimed in claim 10, wherein each of said posts is provided, at its bottom end, with a peripheral protection skirt surrounding the relevant anchor bolt nut.

12. An electric fence as claimed in claim 10, wherein said grooves of each post are straight and parallel.

13. An electric fence as claimed in claim 12, wherein said screwing heads are flat.

14. An electric fence as claimed in claim 13, wherein said screw and anchor bolt of each post are coaxial.

15. An electric fence as claimed in claim 9, wherein each nut engages the negative section of said electric wire and moves it to thus tighten it with respect to another post and then clamps it against the washer.

16. An electric fence for chasing away pigeons or the like undesired birds, said fence comprising:
- a plurality of posts made of electrically insulating material, each post having a flat top end crossed by a groove having a depth of predetermined size and being formed with a tapped hole adjacent to said groove;
- an electric wire having a positive section extending successively through sad grooves of said posts, and having a diameter greater than said predetermined size so as to project out of said grooves;
- screws having threaded stem and screwing heads, each stem being received into one of said tapped holes,
- wherein said screwing heads have a width sufficient to overlap said projecting electric wire whereby said screws clamp said electric wire against said posts;
- wherein each post has a further and like groove across said top end, said tapped hole being located centrally between said grooves;
- a building ledge made of electrically conductive material;
- anchor bolts and means securing said bolts to said ledge to project upwardly therefrom; and
- wherein said posts are each formed, at its bottom end, with a tapped hole; said anchor bolts having threaded stems screwed into said tapped holes.

17. An electric fence as claimed in claim 16, wherein said bolt securing mean comprise:
- an upwardly curved base plate fixed to said ledge, each plate having a bolt hole;
- said anchor bolts having bolt heads larger than said bolt holes and located beneath said base plate; said bolt threaded stems extending through said base plate holes, and
- nuts securing said anchor bolts to said base plates.

18. An electric fence as claimed in claim 17, wherein said bolt holes are key-hole slots, each slot having a large section allowing passage of one of said bolt heads and a narrow section, each narrow section defining one of said base plate holes through which a relevant one of said bolt threaded stems passes, and means securing said anchor bolts to said plates.

19. An electric fence as claimed in claim 18, wherein said grooves of each post are straight and parallel.

20. An electric fence as claimed in claim 19, wherein said screwing heads are flat.

* * * * *